(12) United States Patent
Tanaya

(10) Patent No.: US 6,789,409 B2
(45) Date of Patent: Sep. 14, 2004

(54) KNOCK DETECTION APPARATUS FOR INTERNAL COMBUSTION ENGINE

(75) Inventor: Kimihiko Tanaya, Chiyoda-ku (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/418,097

(22) Filed: Apr. 18, 2003

(65) Prior Publication Data

US 2004/0089056 A1 May 13, 2004

(30) Foreign Application Priority Data

Nov. 8, 2002 (JP) ........................................ 2002-324980

(51) Int. Cl.[7] ........................... G01L 23/22; F02P 17/50
(52) U.S. Cl. ..................................... 73/35.08; 324/399
(58) Field of Search ........................... 73/35.08; 324/399

(56) References Cited

U.S. PATENT DOCUMENTS

| | | | | |
|---|---|---|---|---|
| 6,334,353 B1 | * | 1/2002 | Nobe et al. | ................. 73/35.04 |
| 6,427,662 B2 | * | 8/2002 | Tanaya et al. | ......... 123/406.29 |
| 6,561,163 B1 | * | 5/2003 | Takahashi et al. | ..... 123/406.21 |

FOREIGN PATENT DOCUMENTS

JP 10-009108 A 1/1998

* cited by examiner

Primary Examiner—Edward Lefkowitz
Assistant Examiner—Octavia Davis
(74) Attorney, Agent, or Firm—Sughrue Mion, PLLC

(57) ABSTRACT

A knock detection apparatus for an internal combustion engine is provided which accurately distinguishes knock from noise even when noise having a frequency component identical to a knock frequency component is superposed on an ion current signal. The apparatus includes: an ion-current detection device for applying a voltage to electrodes provided in a combustion chamber of the internal combustion engine and for detecting an ion current flowing between the electrodes via ions generated following combustion in the combustion chamber; a knock detection device for detecting knock occurring following an abnormal rise in either pressure or temperature in the combustion chamber of the internal combustion engine; a center-of-gravity calculation device for calculating a gravity position of an ion current waveform detected by the ion-current detection device; and a knock determination device for determining knock or noise in accordance with outputs of the knock detection device and the center-of-gravity calculation device.

16 Claims, 8 Drawing Sheets

KNOCK DETECTION APPARATUS FOR INTERNAL COMBUSTION ENGINE

BACKGROUND OF THE INVENTION

1. Field of the Invention

The present invention relates to a knock detection apparatus for an internal combustion engine for detecting knock that occurs in the internal combustion engine.

2. Description of the Related Art

Ions are known to occur during fuel combustion in an internal combustion engine. When probes applied with a high voltage are provided in a cylinder of the engine, such ions are observable in the form of an ion current. In addition, a vibration component of a vibration frequency identical to that of the knock is known to be superposed onto the ion current, and the vibration component is extracted to perform knock control.

With a conventional knock control apparatus for an internal combustion engine, an ion current as described above is measured in such a manner that a high voltage is generated to observe the ion current by using a secondary voltage generated by an ignition coil, and the high voltage is applied to ignition plug terminals following the termination of discharge for ignition. The vibration component of the knock frequency band is extracted from the ion current by using a bandpass filter (BPF). Then, the extracted component is amplified (signal amplification) by an amplifier, the signal is compared with a detection threshold value, and the waveform thereof is shaped according to the comparison. As a result, knock pulses are generated. Subsequently, the knock pulses are sent to an engine control unit (ECU), and a determination is performed as to whether knock has occurred. According to the determination result, ignition timing is controlled. That is, knock control is performed (refer to, for example, Patent Document 1).

Patent Document 1

JP 10-9108 A (FIG. 6)

However, depending on the operation condition of the internal combustion engine, even when knock is not occurring, a case may occur in which a vibration component identical to the knock frequency is superposed on the ion current.

A knock detection apparatus such as a bandpass filter which is designed to extract a knock vibration component is incapable of detecting the difference between knock and the above-described noise having the same frequency component as a knock frequency. In addition, many difficulties are present to extract only a knock signal from the noise that is equivalent in both vibration amplitude intensity and vibration duration to noise that involves knock of a high magnitude. These difficulties have introduced significant problems in the development of knock detection apparatuses, particularly, of the type employing an ion-current detection method.

SUMMARY OF THE INVENTION

The present invention has been made to solve the problems described above, and an object of the present invention is therefore to obtain a knock detection apparatus for an internal combustion engine which is capable of accurately distinguishing knock from noise even when noise with a frequency component identical to a knock frequency component is superposed on an ion current signal.

According to the present invention, a knock detection apparatus for an internal combustion engine includes an ion-current detection device, a knock detection device, a center-of-gravity calculation device, and a knock determination device. The ion-current detection device applies a voltage to electrodes provided in a co-combustion chamber of the internal combustion engine, and detects an ion current flowing between the electrodes via ions generated following combustion in the combustion chamber. The knock detection device detects knock occurring following an abnormal rise in either pressure or temperature in the combustion chamber of the internal combustion engine. The center-of-gravity calculation device calculates a gravity position of an ion current waveform detected by the ion-current detection device. Further, the knock determination device determines knock or noise in accordance with outputs of the knock detection device and the center-of-gravity calculation device.

DETAILED DESCRIPTION OF THE PREFERRED EMBODIMENTS

Before describing the present invention, first, the relationship between knock and ion current that occur in an internal combustion engine. The knock is reported as a phenomenon in which when the pressure or the temperature in a combustion chamber rises abnormally, fuel causes self-ignition and explosion. Generally, in an internal combustion engine, when combustion flame has reached a piston head in a state where the piston stays near the top dead center, knock takes place in association with abnormal rise in the intra-cylinder temperature.

Figure 7:
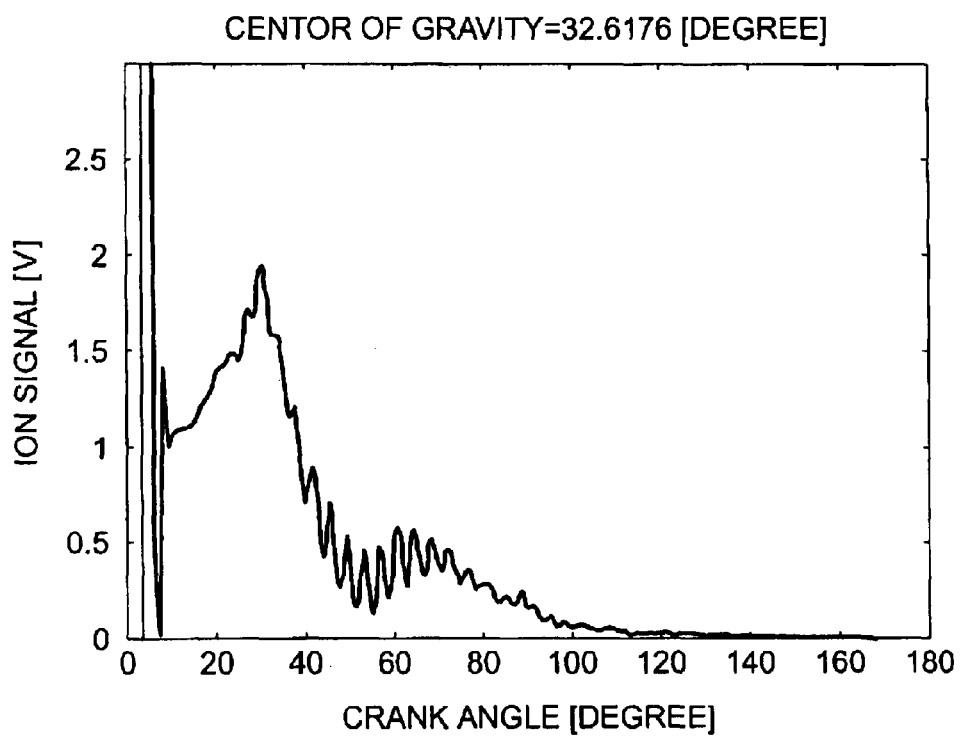
FIG. 7 is an explanatory diagram of an example of an ion-current knock waveform and a center-of-gravity position of the internal combustion engine regarding the first embodiment of the present invention.

As has generally been pointed out, the ion current is promoted to occur primarily for two causes. The one cause is electrons generated following a combustion chemical reaction, and the other cause is minus ions generated following an ionization reaction that is dependent on a burned-gas temperature rise. The peak of the ion current dependent on the former combustion chemical reaction first appears (which hereinbelow will be referred to as a "primary peak"), and thereafter, the peak following the latter ionization reaction dependent on the temperature rise appears (which hereinbelow will be referred to as a "secondary peak"). It has been pointed out that the secondary peak relates closely to the intra-cylinder pressure. Specifically, when the secondary peak exists near the top dead center, the knock-occurrence probability increases. FIG. 7 shows an example of an ion current waveform at the time of knock occurrence.

Figure 8:
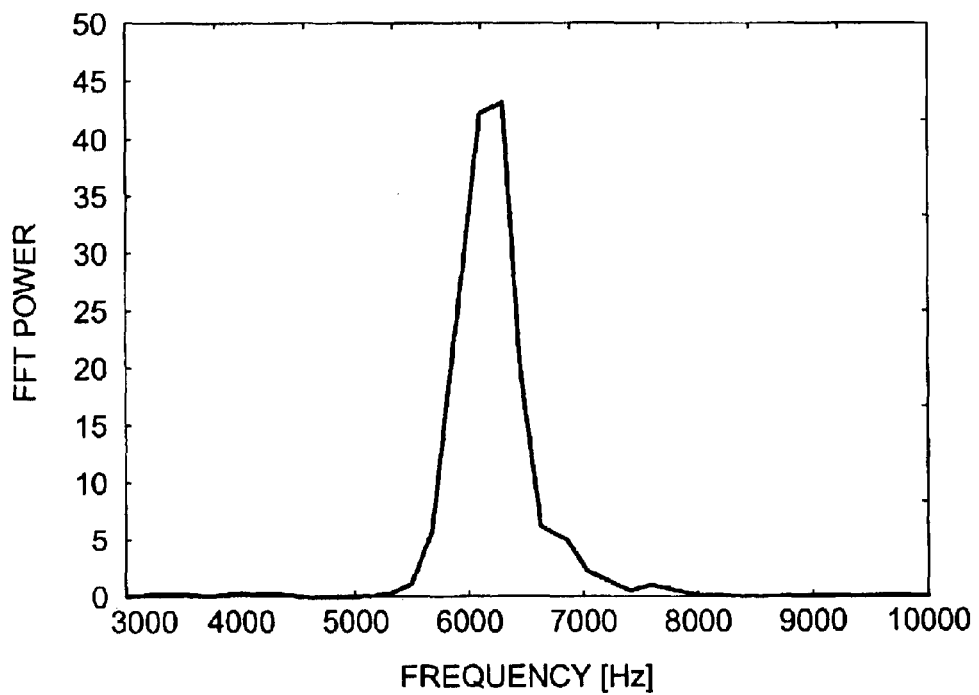
FIG. 8 shows a power spectrum of the example of the ion-current knock waveform of the internal combustion engine regarding the first embodiment of the present invention.

Generally, knock is said to easily occur on an inner wall surface of the combustion chamber. That is, reportedly, since shock waves occurring with the knock primarily spread in the direction of the bore, stationary waves of pressure vibrations occur in the combustion chamber. FIG. 8 shows a frequency spectrum of the knock waveform shown in FIG. 7. Ordinary knock detection apparatuses determine the existence of knock (whether or not knock is occurring) by detecting a vibration ascribed to the stationary wave. Ordinary knock detection apparatuses of another type using ion current uses a method of detecting waves occurring with ionization-probability change caused by temperature change ascribed to pressure vibrations occurring in the cylinder.

Figure 9:
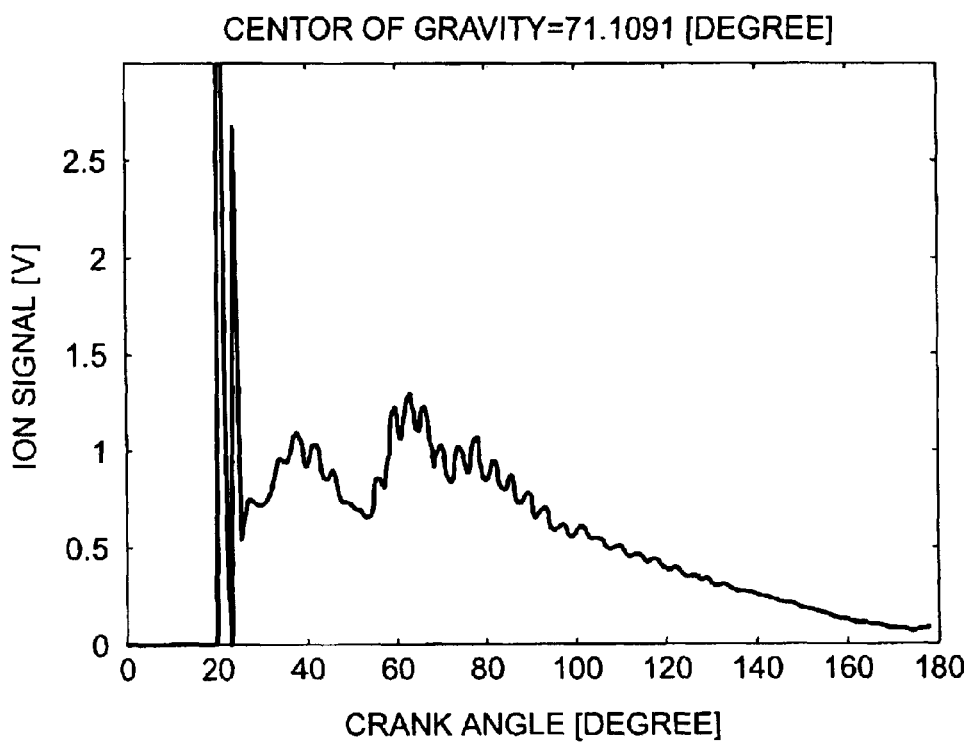
FIG. 9 is an explanatory diagram of an example of an ion-current noise waveform and a center-of-gravity position of the internal combustion engine regarding the first embodiment of the present invention.

However, it has been known to date that pressure vibrations of types other than those dependent on knock also occur in the cylinder. For example, there is a pressure vibration occurring following an irregular combustion, of which the ion current waveform is shown in FIG. 9. However, since the pressure vibration is a stationary wave, the vibration frequency is identical to that occurring with knock, and the amplitude is similar thereto. The knock detection apparatuses using the ion current which are developed to date are incapable of detecting the difference between the vibration and knock, and this has been pointed out as a problem.

The present invention distinguishes between a vibration ascribed to a factor other than the knock and a vibration ascribed to knock in accordance with a center-of-gravity position of an ion current dependent on the secondary peak position described above, thereby improving the knock detection precision.

(First Embodiment)

Figure 1:
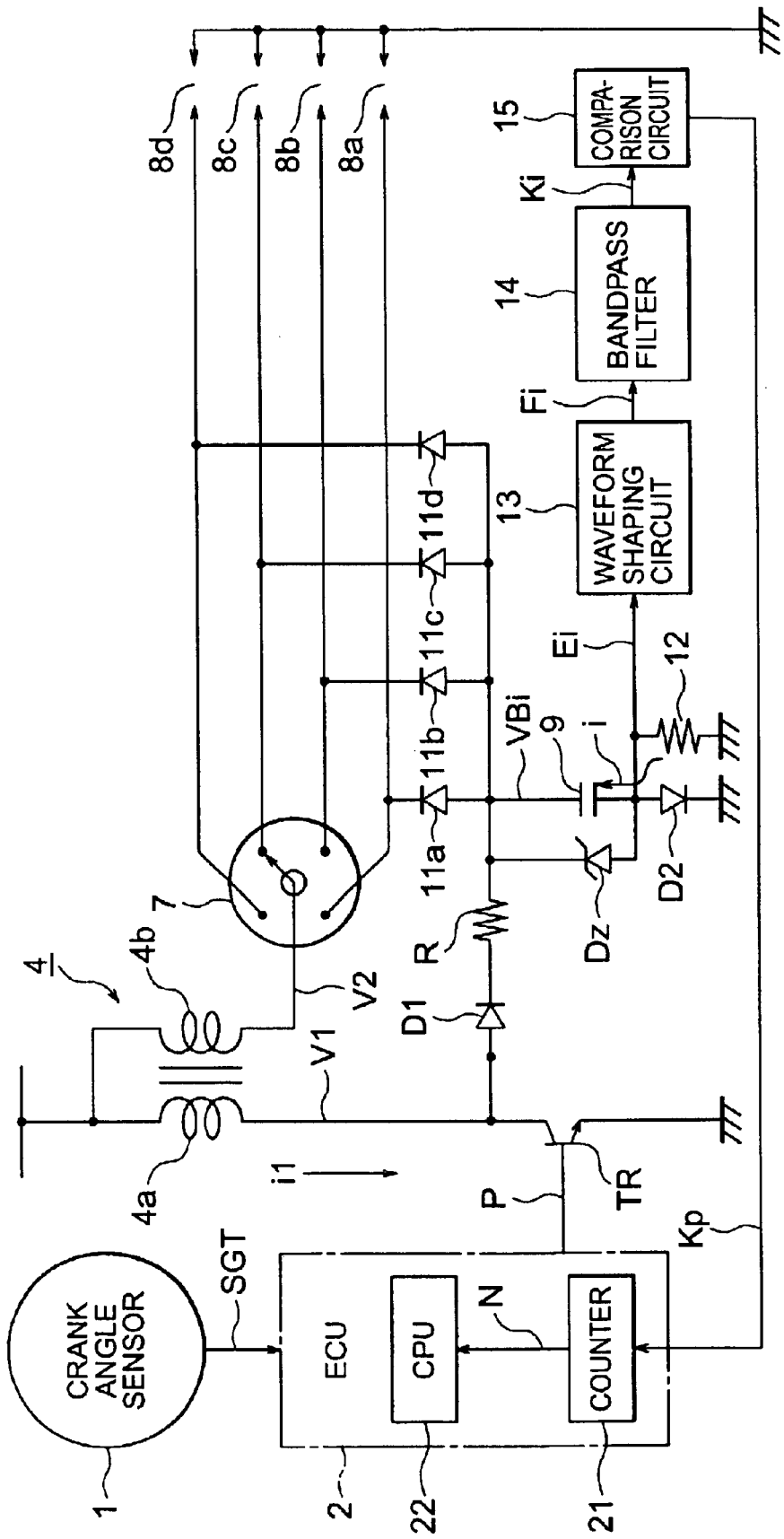
FIG. 1 is a structural diagram of a knock detection apparatus for an internal combustion engine according to a first embodiment of the present invention.

Hereinbelow, a first embodiment of the present invention will be described with reference to the accompanying drawings. FIG. 1 is a structural diagram of a knock detection apparatus for an internal combustion engine according to the first embodiment of the present invention. Referring to FIG. 1, a crank angle sensor 1 is provided on a crankshaft of an internal combustion engine, i.e., engine (not shown). The crank angle sensor 1 outputs a crank-angle signal SGT including pulses corresponding to speeds of the engine. The individual pulse edges of the crank-angle signal SGT indicate crank-angle reference positions of each cylinder (not shown) of the internal combustion engine. The crank-angle signal SGT is input to an ECU 2 (engine control unit) formed of a microcomputer (microprocessor), and is used for various control calculations.

The ECU 2 includes a counter 21 for counting the number of knock pulses N in a knock pulse train Kp that is input from a waveform-processing means described below. In addition, the ECU 2 includes a CPU 22 for determining existence of knock (whether or not knock is occurring) in accordance with the number of pulses N. The counter 21 and the CPU 22 constitute knock detection means in cooperation with the waveform-processing means.

The ECU 2 takes in the crank angle signal SGT from the crank angle sensor 1 and operation information from various sensors (not shown). Then, the ECU 2 performs various calculations corresponding to the operating condition of the internal combustion engine, and outputs drive signals to various actuators including an ignition coil 4 and so forth.

A drive signal for the ignition coil 4, namely, an ignition signal P, is applied to the base of a power transistor TR connected to a primary coil 4a of the ignition coil 4. Thus, on/off control of a power transistor TR is performed to cut off a primary current i1. Cutting of the primary current i1 causes a primary voltage V1 to rise, and a secondary coil 4b of the ignition coil 4 generates a further boosted secondary voltage V2 that is used as a high ignition voltage (several tens of kV).

A distributor 7 is connected to the output terminal of the secondary coil 4b, and sequentially distributes the secondary voltage V2 to be applied to ignition plugs 8a to 8d within the individual cylinders in synchronization with the rotation of the internal combustion engine. Thus, discharge spark is generated in each combustion chamber of, for example, an ignition-controller, and an air-fuel mixture is combusted therein.

The apparatus configuration includes a serial circuit formed to include a rectifying diode D1 connected to one end of the primary coil 4a, a current-limiting resistor R, a capacitor 9 connected in parallel to a voltage-limiting Zener diode DZ, and a rectifying diode D2. The serial circuit is connected from the one end of the primary coil 4a to the ground, thereby forming a path to allow charging current to flow to the capacitor 9 (which is used as a bias power source for ion current detection.

The capacitor 9 parallely connected between two ends of the Zener diode DZ is charged with charging current due to the primary voltage V1 to a predetermined bias voltage VBi (several hundreds of volts). Thus, the capacitor 9 functions as a bias power source used to detect an ion current i, thus causing the ion current i to flow therethrough by performing discharge through ignition-controlled one of the ignition plugs 8a to 8d.

High-voltage diodes 11a to 11d have their anodes connected to one end of the capacitor 9 and have their cathodes connected to one end of the ignition plugs 8a to 8d to have the same polarity as the ignition polarity. A resistor 12 used for ion current detection is connected to the other end of the capacitor 9, whereby the ion current i is voltage-converted and is output as ion current detection signals Ei.

The resistor 12 is connected to the other end of each of the ignition plugs 8a to 8d via the ground to form, along with the capacitor 9 and high-voltage diodes 11a through 11d, a path for allowing the ion current i to flow.

The ion current detection signal Ei, which has been output from the resistor 12, is waveform-shaped by a waveform-shaping circuit 13 into a signal Fi, and only a knock signal Ki is subsequently extracted via a bandpass filter 14. Further, the knock signal Ki is converted by a comparison circuit 15 into a knock pulse train Kp, and the knock pulse train Kp is then input to the counter 21 in the ECU 2.

The waveform-shaping circuit 13, the bandpass filter 14, and the comparison circuit 15 together constitute a waveform-processing means for extracting the knock pulse train Kp from the ion current detection signal Ei. From the knock pulse train Kp, the ECU 2 counts the number of pulses N, which is used to determine the existence of knock, as described above.

Figure 2:
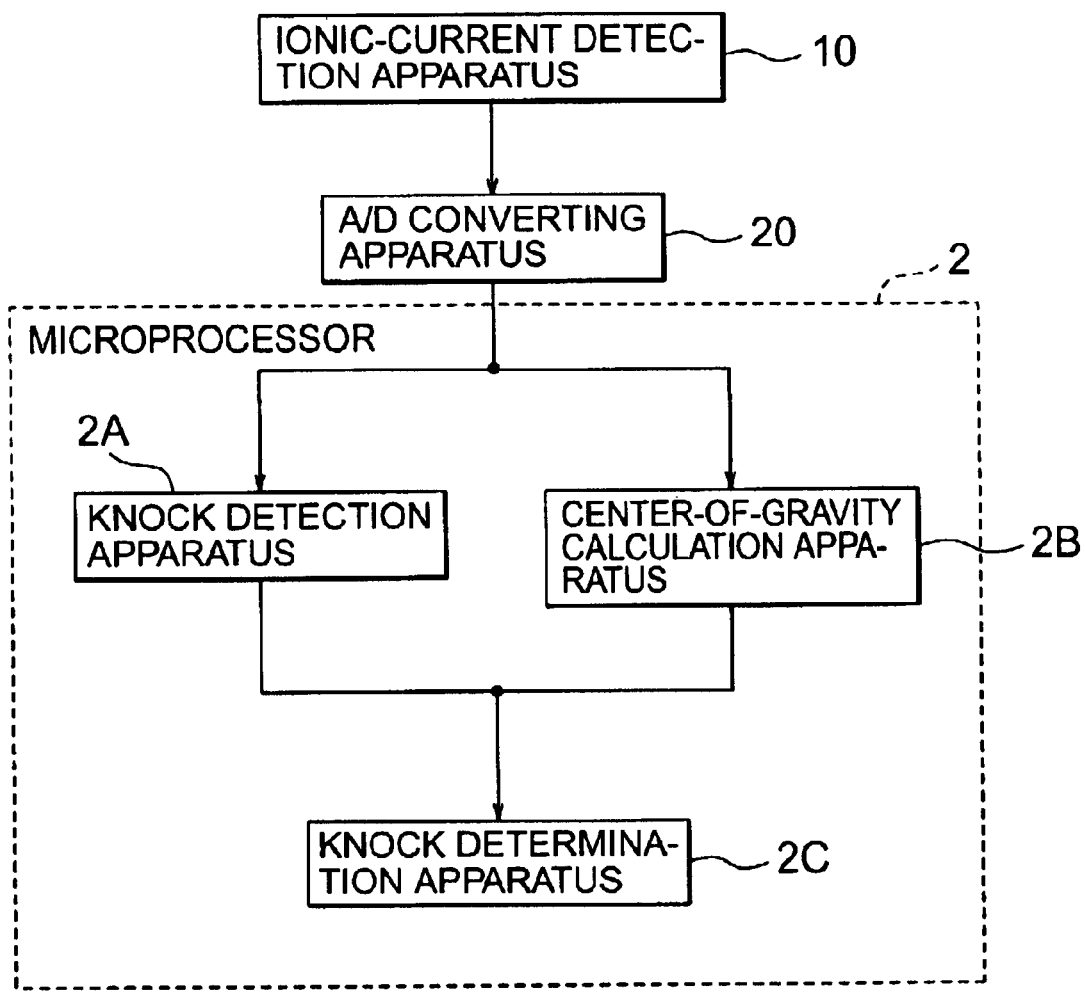
FIG. 2 is a functional block diagram of the knock detection apparatus for an internal combustion engine according to the first embodiment of the present invention.

FIG. 2 is a functional block diagram of the knock detection apparatus for an internal combustion engine according to the first embodiment of the present invention. Referring to FIG. 2, an ion-current detection apparatus 10 detects ions, which are generated inside the internal combustion engine, as current. Specifically, a voltage is applied to electrodes provided in the combustion chamber of the internal combustion engine, and an ion current flowing between the electrodes via ions generated following combustion inside the combustion chamber is detected. The ionic-current detection apparatus 10 is configured to include the following components shown in FIG. 1. The components are the rectifying diode D1; the current-limiting resistor R; the serial circuit configured of the capacitor 9 and the rectifying diode D2 parallely connected to the voltage-limiting Zener diode DZ; the capacitor 9 parallely connected between two ends of the voltage-limiting Zener diode DZ; and the ion-current detecting resistor 12 that voltage-converts the ion current i to thereby output the result in the form of the ion current detection signals Ei.

An A/D converting apparatus 20 shown in FIG. 2 corresponds to the waveform-processing means formed of the waveform-shaping circuit 13, the bandpass filter 14, and the comparison circuit 15, as shown in FIG. 1. The ion current that has been output from the ionic-current detection apparatus 10 is converted from analog data to digital data via the A/D converting apparatus 20, and the digital data is input to a microprocessor 2.

In the microprocessor 2, operations are performed as described hereunder. The input data is input to a knock detection apparatus 2A and a center-of-gravity calculation apparatus 2B. The knock detection apparatus 2A detects knock ascribed to an abnormal rise of either the pressure or the temperature in the combustion chamber of the internal combustion engine in accordance with the ion current detected by ionic-current detection apparatus 10. The center-of-gravity calculation apparatus 2B calculates a gravity position of the ion current waveform detected by the ionic-current detection apparatus 10. In addition, according to outputs of the knock detection apparatus 2A and center-of-gravity calculation apparatus 2B, a knock determination apparatus 2C determines whether knock or noise has occurred.

Figure 3:
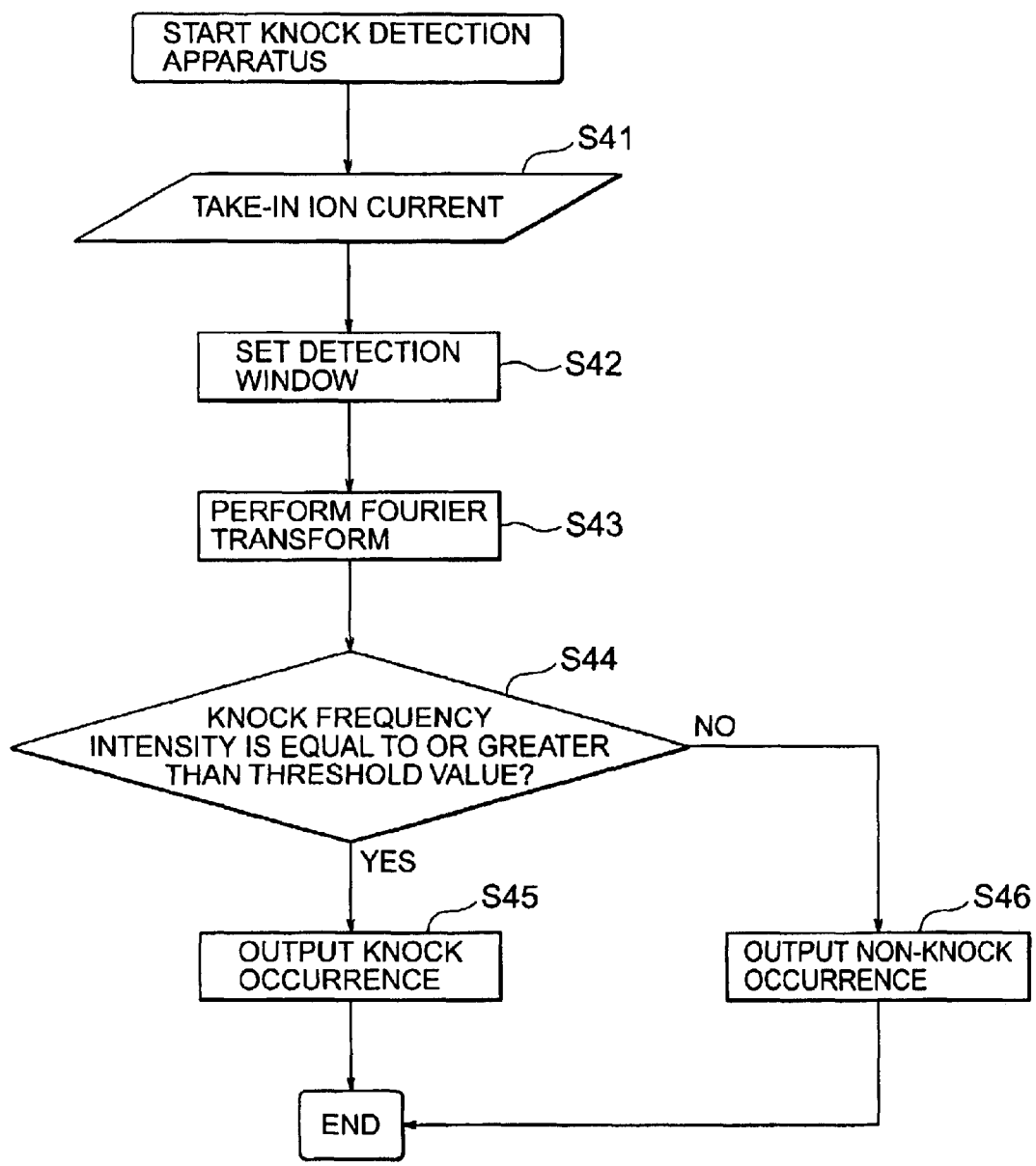
FIG. 3 is a flowchart of a knock detection method used with the knock detection apparatus for an internal combustion engine according to the first embodiment of the present invention.

Hereinbelow, operation of the knock detection apparatus 2A shown in FIG. 2 will be described with reference to a flowchart shown in FIG. 3. First, an ion current input in step S41 is processed such that only data of a necessary segment is allocated in a segment (detection window) set in step S42, and is multiplied with a window function for suppressing the influence of the ends of data. The data thus preprocessed undergoes Fourier transform in step S43 into the form of a power spectrum. A frequency intensity corresponding to a knock-specific vibration frequency in the power spectrum is compared to a predetermined threshold value in step S44. If the frequency intensity exceeds the threshold value, the knock detection apparatus 2A outputs signal indicative of an occurrence of knock (step S45). If the frequency intensity is less than the threshold value, the knock detection apparatus 2A outputs a signal indicating that no knock is occurring (step S46).

Figure 10:
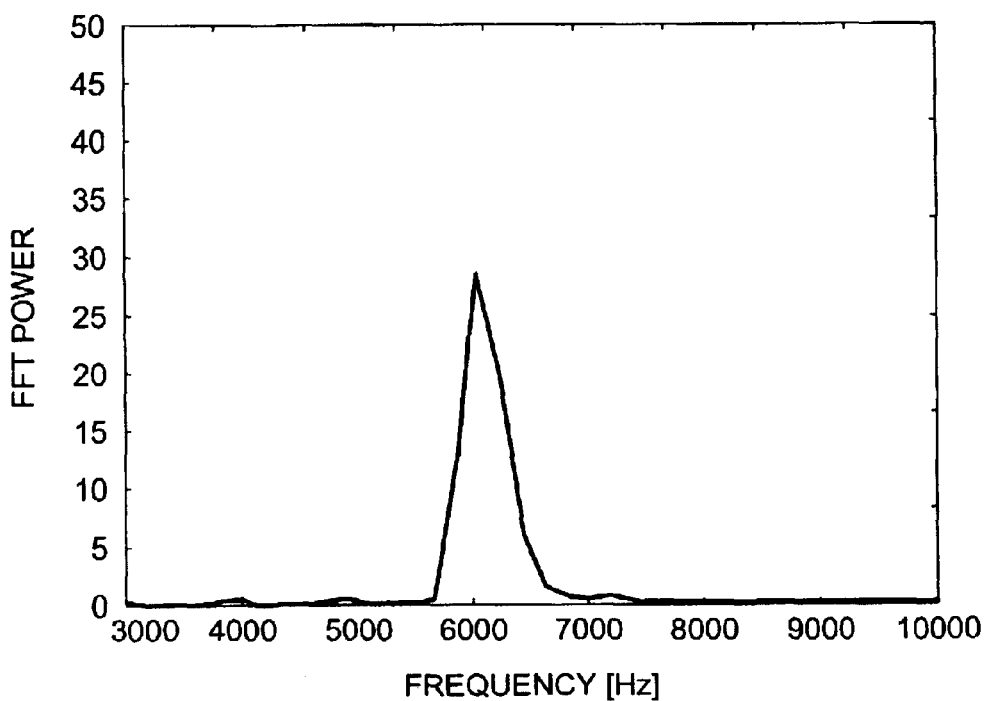
FIG. 10 shows a power spectrum of the example of the ion-current noise waveform of the internal combustion engine regarding the first embodiment of the present invention.

FIG. 8 shows an example of Fourier-transform power spectrum formed when an ion current illustrated in FIG. 7 is input. According to the spectrum shown in FIG. 8, since the knock-specific vibration frequency is about 6 kHz, a case is considered in which the power spectrum close to this frequency is arranged according to a rule of thumb. For example, as shown in FIG. 8, the FET power value "5" on the vertical axis is assigned to the knock intensity "1", and the FET power value "25" is assigned to the knock intensity "5". In this case, the corresponding power spectrum is significantly greater than the threshold value. Accordingly, when expressing the knock intensity as a signal indicative of occurrence of the high-intensity knock, for example, the digital number of pulses, the knock detection apparatus 2A outputs five pulses that signify the occurrence of the high-intensity knock. Similarly, when an ion current illustrated in FIG. 9 is input, the power spectrum is formed as shown in FIG. 10. Also in this case, since the corresponding power spectrum is significantly greater in comparison with the similar threshold value "5", the knock detection apparatus 2A outputs five pulses, which signify the occurrence of the high-intensity knock, for the waveform.

The digital data, which has been output from the A/D converting apparatus 2, is input to the center-of-gravity calculation apparatus 2B. Hereinbelow, operation of the center-of-gravity calculation apparatus 2B will be described with reference to a flowchart shown in FIG. 4. An ion current signal that has been output in step S51 is processed such that preprocesses such as detection-segment setting and noise removal are performed in step S52 to remove unnecessary information. According to the first embodiment of the present invention, a signal preprocessed to set the detection segment as an angle based segment from the ignition time to the subsequent-cylinder ignition time is subjected to a calculation of the center-of-gravity position in step S53.

In the first embodiment of the present invention, a primary cumulant arithmetic expression is used to obtain the center of gravity, whereby the center-of-gravity position is calculated as a value on an angle basis. The center-of-gravity position thus calculated is output from the center-of-gravity calculation apparatus 2B. For example, the center-of-gravity position of the knock waveform shown in FIG. 7 is close to the numeric value 33 CADs (crank angle degrees) shown above the waveform of FIG. 7, and this numeric value is output from the center-of-gravity calculation apparatus 2B. Similarly, the center-of-gravity position of the knock waveform shown in FIG. 9 is close to 71 CADs, and also the numeric value is output from the center-of-gravity calculation apparatus 2B.

Figure 5:
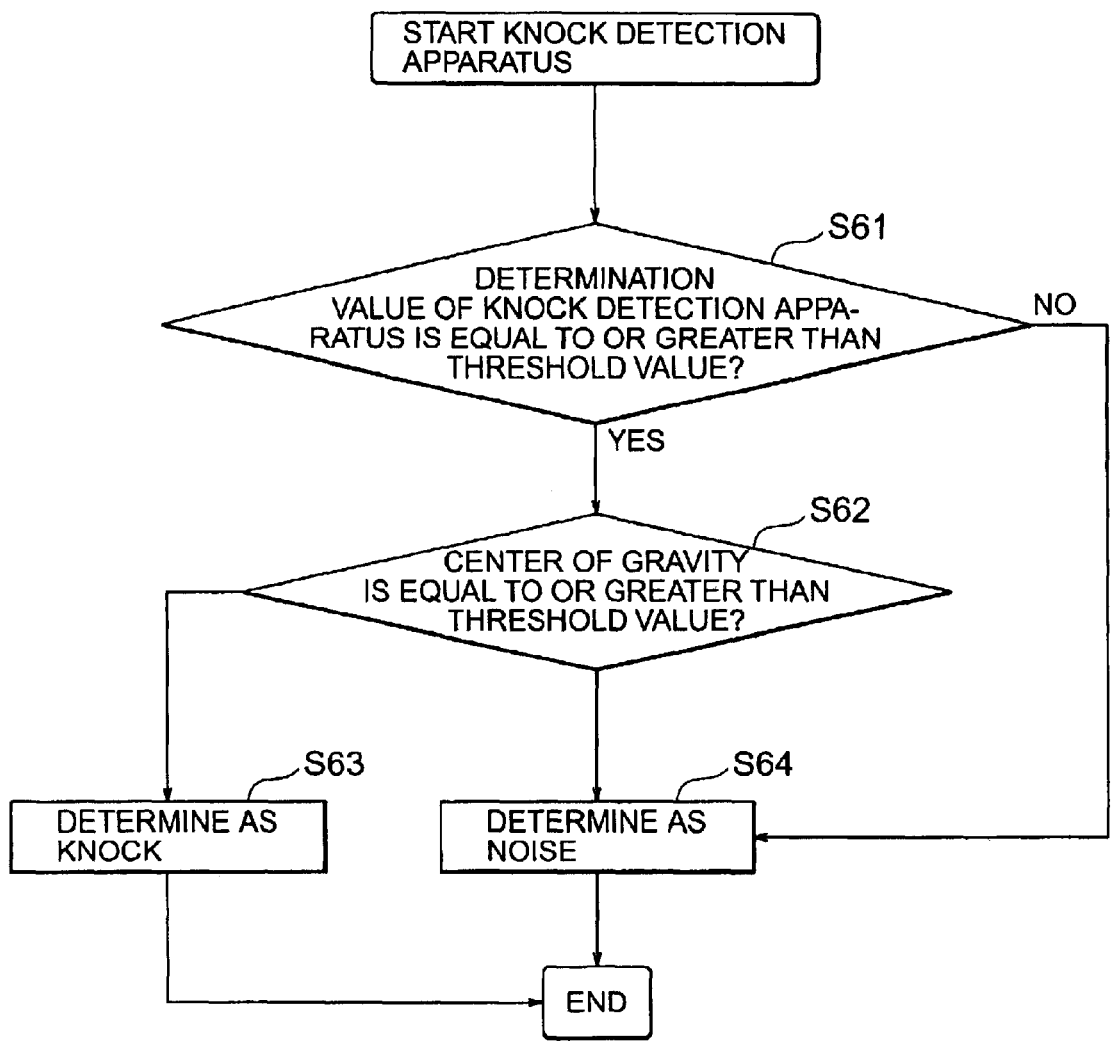
FIG. 5 is a flowchart of a knock determination method used with the knock detection apparatus for an internal combustion engine according to the first embodiment of the present invention.

Referring to FIG. 2, the outputs of the knock detection apparatus 2A and the center-of-gravity calculation apparatus 2B are input to the knock determination apparatus 2C. In a system of the knock determination apparatus 2C, the output of the knock detection apparatus 2A is diagnosed for reliability in output again. Hereinbelow, operation of the knock determination apparatus 2C will be described with reference to a flowchart shown in FIG. 5. In step S61, the system determines as to whether the output (determination value) of the knock detection apparatus 2A is greater than or equal to a threshold value. Thus, the system determines as to whether the output indicates a knock occurrence. If the knock detection apparatus 2A has output a signal indicating that no knock is occurring, the process proceeds to step S64 whatever may be the output of the center-of-gravity calculation apparatus 2B. Then, also the knock determination apparatus 2C outputs a non-knock occurrence signal (noise determination signal). However, when the knock detection apparatus 2A has output a signal indicative of a knock occurrence, the process proceeds to step S62.

In step S62, first, the system compares the output of the center-of-gravity calculation apparatus 2B to a predetermined threshold value. If the output of the center-of-gravity calculation apparatus 2B is greater than or equal to the threshold value, the system determines that the output of the knock detection apparatus 2A is low in reliability, and the knock determination apparatus 2C outputs a non-knock occurrence signal (noise determination signal). In contrast, if the output of the center-of-gravity calculation apparatus 2B is less than threshold value, the system determines that the output of the knock detection apparatus 2A is high in reliability, and the knock determination apparatus 2C outputs a knock occurrence signal. In this case, the threshold value for the output of the center-of-gravity calculation apparatus 2B is predetermined in accordance with the crank angle.

For example, the output of the knock detection apparatus 2A for the waveform shown in FIG. 7 is assumed as five pulses. In addition, the output of the center-of-gravity calculation apparatus 2B for the same waveform is 33 CADs (crank angle degrees). If the threshold value in step S62 is set to 45 CADs according to a rule of thumb, 33 CADs are determined as values equal to or less than the threshold value, so that the output (five pulses) of the knock detection apparatus 2A is output as is from the knock determination apparatus 2C.

In comparison to the above, assuming that the output of the knock detection apparatus 2A also for the waveform shown in FIG. 9 is five pulses, the output of 71 CADs from the center-of-gravity calculation apparatus 2B is compared with the threshold value of 45 CADs in the above-described step S62. However, in this case, since the output exceeds the threshold value, the process proceeds to step S64, and the system determines therein that the output of five pulses from the knock detection apparatus 2A is questionable. As a result, the knock determination apparatus 2C outputs zero pulse indicating that no knock is occurring at this time, thereby enabling the determination of the difference between the knock waveform of FIG. 7 and the waveform of FIG. 9 which is ascribed to the irregular combustion.

Thus, according to the first embodiment described above, erroneous knock determinations can be reduced, and the knock detection precision of the knock detection apparatus can be improved.

(Second Embodiment)

Figure 4:
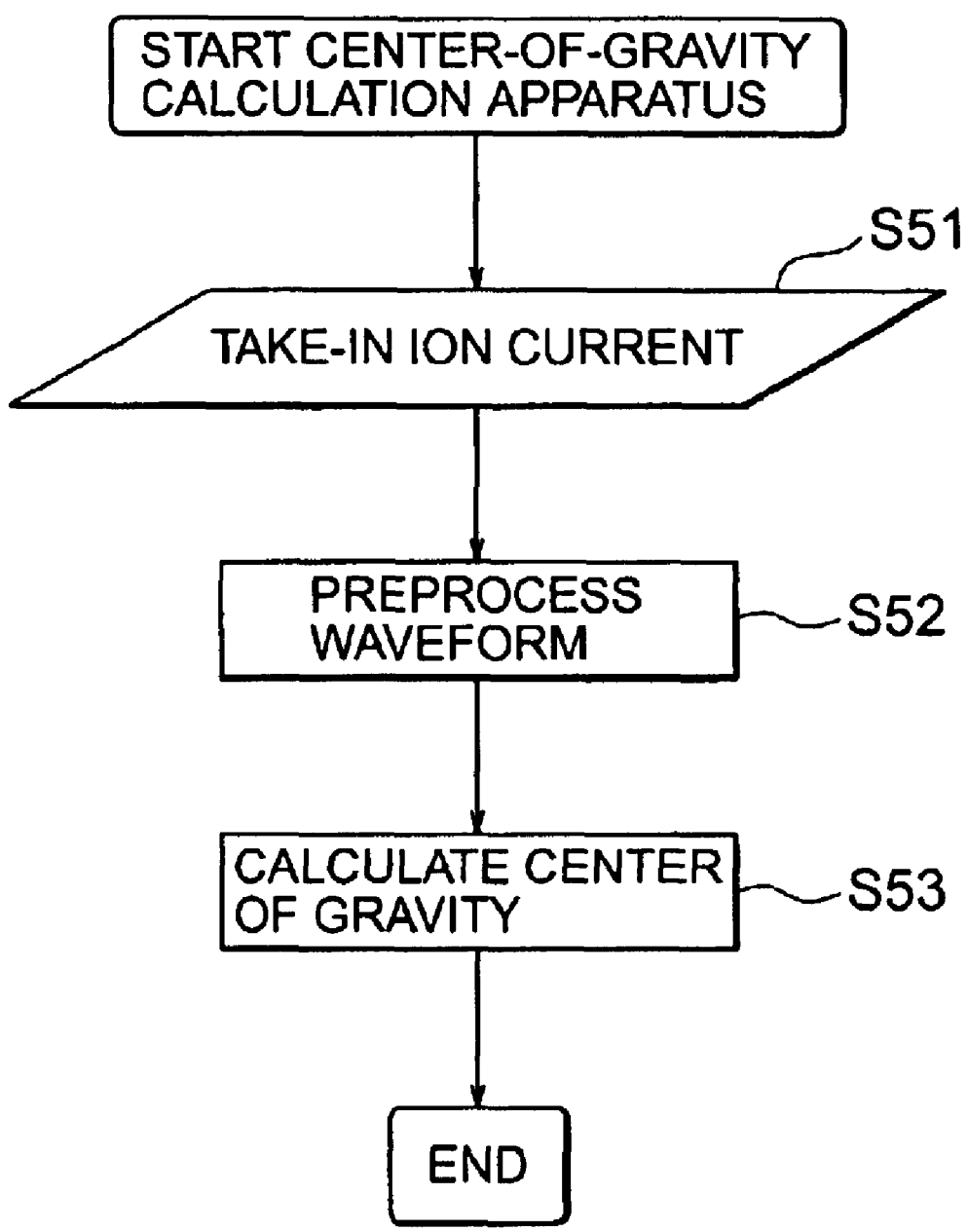
FIG. 4 is a flowchart of a center-of-gravity calculation method used with the knock detection apparatus for an internal combustion engine according to the first embodiment of the present invention.

In the first embodiment described above, the noise removal process is performed as the waveform preprocess shown in the block of process step S52 of FIG. 4 to improve the knock detection precision in the center-of-gravity calculation apparatus 2B. However, even when the noise removal process is omitted to reduce the calculation load, equivalent calculation results can be obtained.

(Third Embodiment)

According to the first embodiment described above, the detection segment in the center-of-gravity calculation apparatus 2B is set to the angle based segment of the crank angle from the ignition timing to the subsequent-cylinder ignition time. However, even with a time based segment or a data-quantity based segment, equivalent results can be obtained. In addition, the detection-segment commencement position may either be an ion-current generation position or be a position where the noise influence immediately after the ion-current detection commencement is avoided. Moreover, the termination position may be an ion-current termination position according to the comparison with the predetermined threshold value. Alternatively, the commencement position and the termination position of the detection segment may individually be map values that can arbitrarily be set corresponding to the engine operation condition.

(Fourth Embodiment)

According to the first embodiment described above, the center-of-gravity calculation apparatus 2B uses the primary cumulant arithmetic expression to calculate the position of the center of gravity. However, the expression may either be a secondary cumulant arithmetic expression or be a higher order cumulant arithmetic expression to obtain equivalent results. Alternatively, equivalent results can be obtained in the following manner. Ion current signals are sequentially integrated starting from the detection commencement position, and the area of the ion current waveform is calculated, and the segment is calculated until the half of the area is reached. Then, the segment is output by the center-of-gravity calculation apparatus as the center-of-gravity position.

(Fifth Embodiment)

According to the fourth embodiment described above, the segment is used as the center-of-gravity position until the half of the ion-current waveform area is reached. However, a segment increasing in value until a predetermined ratio of the ion-current waveform area is reached may be output by the center-of-gravity calculation apparatus as the center-of-gravity position. For example, a time extending to reach 30% of the ion-current waveform area is output as the center-of-gravity position. Since the generation amount of the ion current involves an occurrence of knock proportional to the combustion mass ratio, also the period of time increasing until a predetermined combustion mass ratio is reached is shortened. Specifically, even without sticking to 50% of the ion-current waveform area, a knock occurrence can be determined from the segment increasing in value until a knock occurrence ratio according to a rule of thumb is reached.

As described above, according to the fifth embodiment, an existence of a knock occurrence can be determined using the segment increasing in value until a predetermined ratio of the ion-current waveform area is reached. Consequently, erroneous knock determinations can be reduced, and the knock detection precision of the knock detection apparatus can be improved.

(Sixth Embodiment)

According to the first embodiment, in the center-of-gravity calculation apparatus 2B, the center-of-gravity position is calculated as the angle based value, but may be calculated as a time based value or a data-quantity based value.

(Seventh Embodiment)

According to the first embodiment, the center-of-gravity position is used as the center-of-gravity position in the detection segment that has been set. However, the arrangement may be modified such that a ratio of the center-of-gravity position to the detection segment length may be output from the center-of-gravity calculation apparatus 2B, and the reliability of the output of knock detection apparatus 2A may be corrected according to the aforementioned output of the center-of-gravity calculation apparatus 2B.

(Eighth Embodiment)

According to the first embodiment as described above, the predetermined threshold value is set using the threshold value for the output of the center-of-gravity calculation apparatus 2B, which is indicated in step S62 of the knock determination apparatus 2C. However, the predetermined threshold value may be set in the form of a map value dependent on the engine operation condition including, for example, the engine speed and load. Thus, improvement can be implemented in the precision of the knock detection apparatus that uses ion current that is easily influenced by the operation condition.

(Ninth Embodiment)

According to the first embodiment, when the determination result in step S61 of the knock determination apparatus 2C is questionable, the knock determination apparatus 2C outputs the signal indicating non-knock occurrence (knock determination signal) whatever may be the output of the center-of-gravity calculation apparatus 2A. However, the output value may either be subtracted by a predetermined amount or be reduced to a predetermined ratio. For example, suppose that five pulses indicating high-intensity knock are input to the knock determination apparatus 2C, and the output is determined as questionable in step S62. In this case, three pulses are subtracted from the output of the knock detection apparatus 2A while preventing the subtraction result from being fewer than zero pulse. As a result, the knock determination apparatus 2C outputs two pulses, thereby changing the output to indicate the probability of a low-intensity knock occurrence. Thus, the risk of erroneously determining the calculation of the center-of-gravity position can be reduced, and concurrently, noise retardation ascribed to the erroneous knock determination can be reduced.

(Tenth Embodiment)

According to the first and ninth embodiments, in step S61 of the knock determination apparatus 2C, the output thereof is determined from two alternatives, that is, the output thereof is determined as to whether it is questionable or unquestionable. However, the compensation amount for the output of knock detection apparatus 2A may be adjusted in accordance with any one of the difference from the threshold value, the ratio to the threshold value, and a function. For example, suppose that the center-of-gravity position for the threshold value of 45 CADs is 71 CADs. In this case, when the result of (center-of-gravity position–threshold value) is less than 10 CADs, minus two pulses are set for the adjustment of the output of the knock detection apparatus 2A; when the result is in a range of 10 to 20 CADs, minus four pulses are set therefor; and when the result is equal to or greater than 20 CADs, minus five pulses are set therefor. Alternatively, when the center-of-gravity position is less than or equal to 1.2 times the threshold value of 45 CADs, minus three pulses are set for the adjustment; and when the center-of-gravity position is greater than or equal to 1.2 times the threshold value, minus five pulses are set therefor. Thus, the adjustment range can be widened. In addition, the risk of erroneously determining the calculation of the center-of-gravity position can be reduced more efficiently, and concurrently, noise retardation ascribed to the erroneous knock determination can be reduced. Further, the risk of erroneous determinations can be avoided even more efficiently by setting the differences, ratios, functions, and the like described above in the form of map values dependent on the operation condition.

Furthermore, the value set by the knock determination apparatus 2C in accordance with the result of the comparison of the output of the center-of-gravity calculation apparatus 2B with the preset threshold value may be subjected to addition/subtraction or multiplication/division with respect to the output of the knock detection apparatus 2A.

(Eleventh Embodiment)

Figure 6:
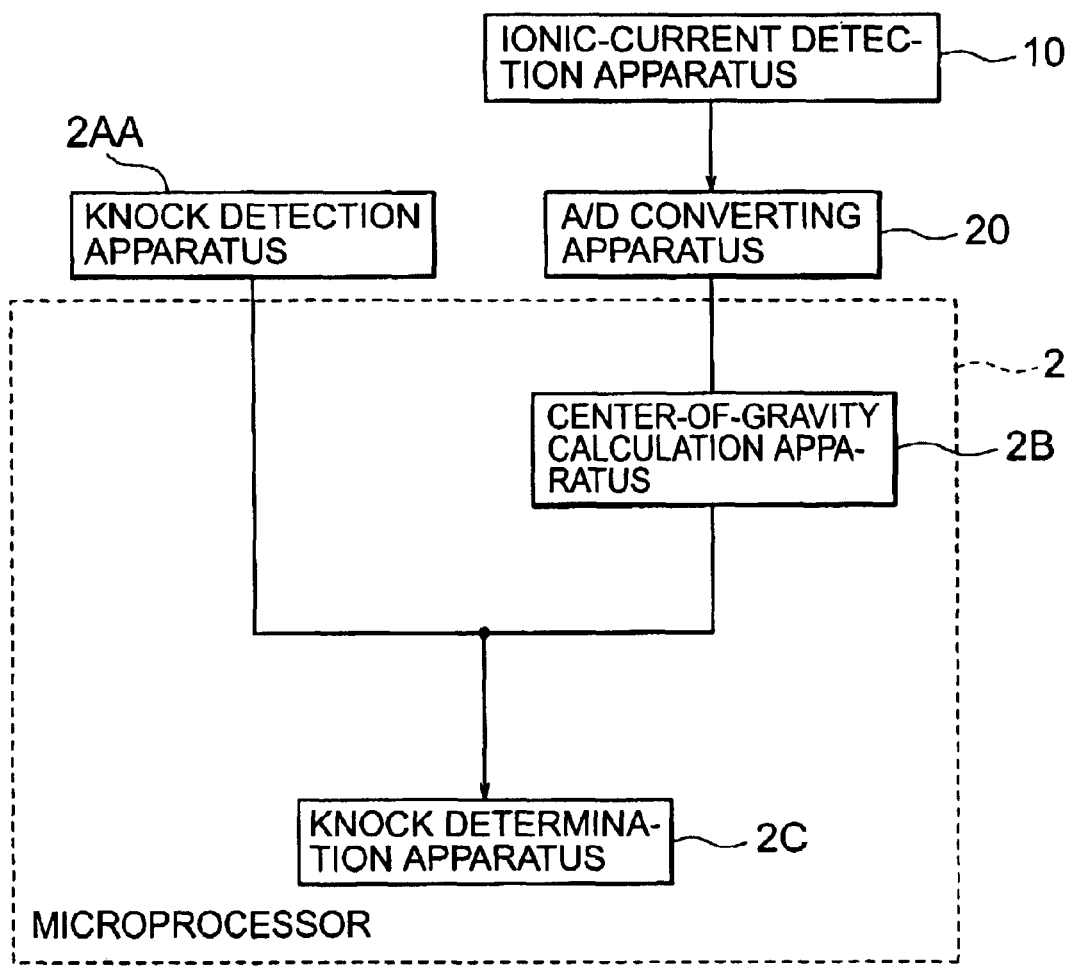
FIG. 6 is a schematic diagram of a knock detection apparatus for an internal combustion engine according to an eleventh embodiment of the present invention.

According to the first embodiment described above, the knock detection apparatus employing the ion-current detection system is used as the knock detection apparatus 2A. However, as shown in FIG. 6, an apparatus that is not dependent on the ion-current system may be used as a knock detection apparatus 2AA. For example, a dissonant-type knock sensor or a knock sensor formed by combining a bandpass filter with an intra-cylinder pressure sensor output may be used. In this case also, the apparatus works as an apparatus that uses ion current only for determining the reliability of the output of the knock detection apparatus 2AA, thereby similarly enabling the knock detection precision to further be improved.

As described above, according to the individual embodiments, even when a noise component having exactly the same frequency component as that of knock is superposed on an ion current signal, the knock can accurately be distinguished from the noise.

In addition, the knock signal can accurately be detected, and the knock can efficiently be detected.

Further, the individual embodiments are capable of providing appropriate functions corresponding to changes in the ion-current detection condition such as individual difference of internal combustion engines or secular change.

Furthermore, an advantage is exhibited in that the influence of an erroneous determination of the apparatus can be reduced.

As described above, according to the present invention, the knock can accurately be distinguished from noise.

What is claimed is:

1. A knock detection apparatus for an internal combustion engine, comprising:
   ion-current detection means for applying a voltage to electrodes provided in a combustion chamber of the internal combustion engine and for detecting an ion current flowing between the electrodes via ions generated following combustion in the combustion chamber;
   knock detection means for detecting knock occurring following an abnormal rise in either pressure or temperature in the combustion chamber of the internal combustion engine;
   center-of-gravity calculation means for calculating a gravity position of an ion current waveform detected by the ion-current detection means; and
   knock determination means for determining knock or noise in accordance with outputs of the knock detection means and the center-of-gravity calculation means.

2. A knock detection apparatus for an internal combustion engine according to claim 1, wherein the knock detection means detects the knock in accordance with the ion current detected by the ion-current detection means.

3. A knock detection apparatus for an internal combustion engine according to claim 1, wherein the knock detection means detects the knock by using either a vibration sensor or a pressure sensor.

4. A knock detection apparatus for an internal combustion engine according to claim 1, wherein the center-of-gravity calculation means detects either a crank angle or a segment to be used as a center-of-gravity position of the ion current detected by the ion-current detection means.

5. A knock detection apparatus for an internal combustion engine according to claim 4, wherein the center-of-gravity calculation means calculates a cumulant of the ion current waveform detected by the ion-current detection means.

6. A knock detection apparatus for an internal combustion engine according to claim 1, wherein the center-of-gravity calculation means calculates either a crank angle or a segment that increases in value until the value of a predetermined ratio of the area of the ion current waveform detected by the ion-current detection means is reached, and uses either the crank angle or the segment as a center-of-gravity position.

7. A knock detection apparatus for an internal combustion engine according to claim 6, wherein the center-of-gravity calculation means calculates a segment that increases in value until the half of the area of the ion current waveform is reached, and uses the segment as the center-of-gravity position.

8. A knock detection apparatus for an internal combustion engine according to claim 1, wherein the center-of-gravity calculation means calculates a ratio of a center-of-gravity position and a calculation segment, which are calculated, and outputs the result.

9. A knock detection apparatus for an internal combustion engine according to claim 1, wherein the center-of-gravity calculation means calculates the gravity in accordance with an occurrence segment of the ion current detected by the ion-current detection means.

10. A knock detection apparatus for an internal combustion engine according to claim 1, wherein the center-of-gravity calculation means calculates the center of gravity in accordance with a map value preset in accordance with an operation condition of the internal combustion engine.

11. A knock detection apparatus for an internal combustion engine according to claim 1, wherein the knock determination means determines the knock or the noise in accordance with the result of a comparison between an output of the center-of-gravity calculation means and a preset threshold value.

12. A knock detection apparatus for an internal combustion engine according to claim 11, wherein the preset threshold value in the knock determination means is a map value preset in accordance with an operation condition of the internal combustion engine.

13. A knock detection apparatus for an internal combustion engine according to claim 11, wherein the knock determination means compensates for the output of the knock detection means in accordance with a difference between the output of the center-of-gravity calculation means and the threshold value.

14. A knock detection apparatus for an internal combustion engine according to claim 11, wherein the knock determination means compensates for the output of the knock detection means in accordance with a ratio between the output of the center-of-gravity calculation means and the threshold value.

15. A knock detection apparatus for an internal combustion engine according to claim 11, wherein the knock determination means performs addition and/or subtraction of a value set in accordance with the result of a comparison between the output of the center-of-gravity calculation means and the preset threshold value with respect to the output of the knock detection means.

16. A knock detection apparatus for an internal combustion engine according to claim 11, wherein the knock determination means performs multiplication and/or division of a value set in accordance with the result of a comparison between the output of the center-of-gravity calculation means and the preset threshold value with respect to the output of the knock detection means.

* * * * *